Sept. 13, 1938.  E. C. MEYER  2,129,704
COUPLING WITH DISCONNECTER
Filed May 17, 1934   3 Sheets-Sheet 1

Inventor
E.C. MEYER
By Hazard and Miller
Attorneys.

Inventor
E. C. MEYER
by Hazard and Miller
Attorneys.

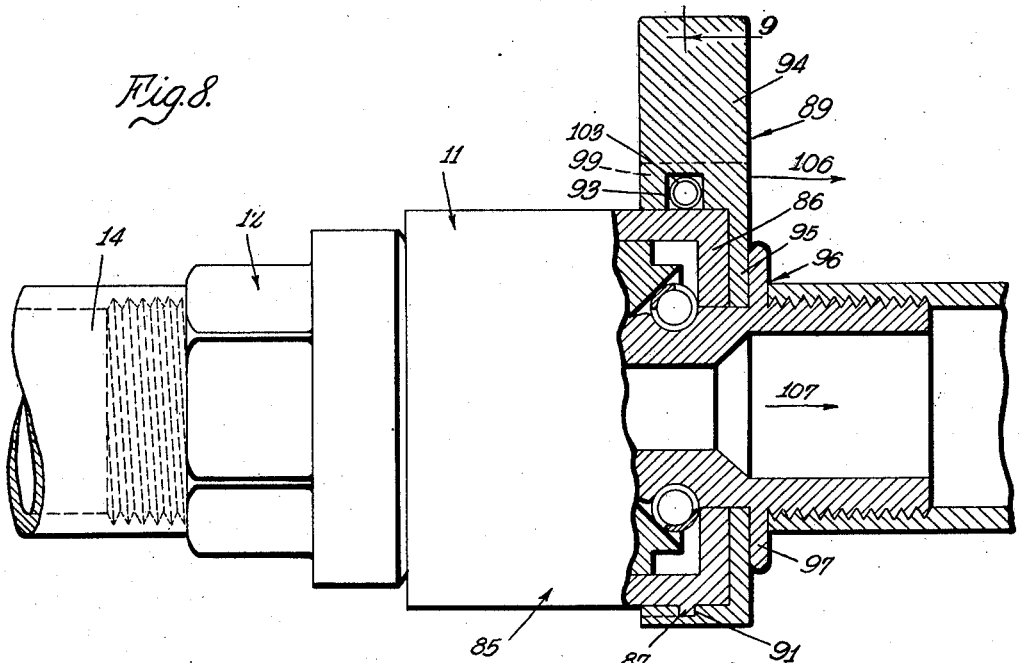
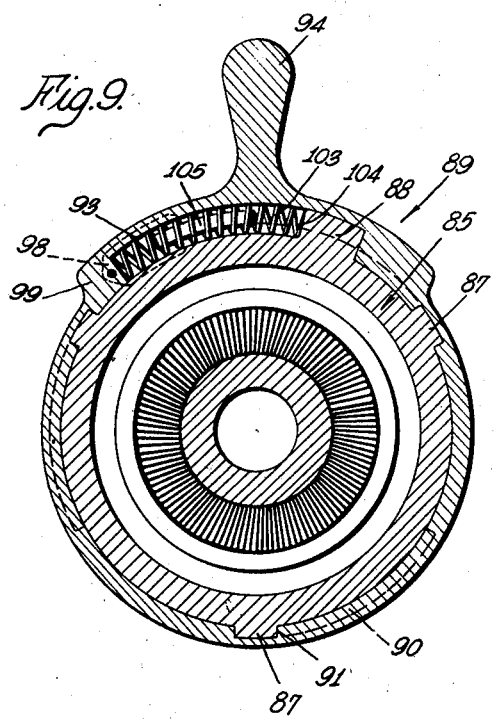
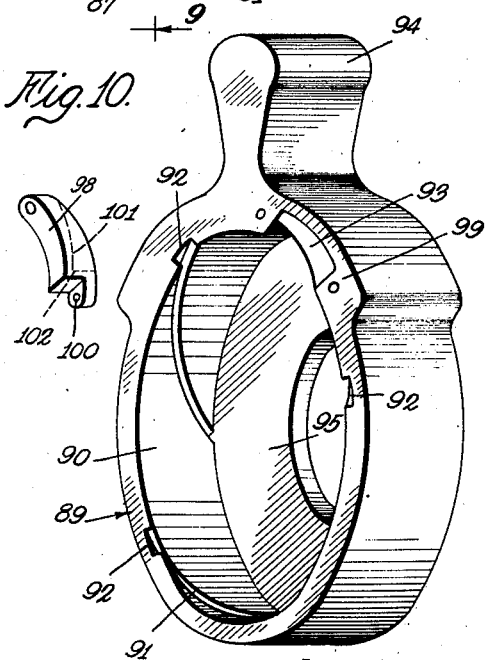

Patented Sept. 13, 1938

2,129,704

UNITED STATES PATENT OFFICE 2,129,704

COUPLING WITH DISCONNECTER

Edwin C. Meyer, Los Angeles, Calif., assignor to Meyer Coupling Company, Inc.

Application May 17, 1934, Serial No. 726,080

11 Claims. (Cl. 284—19)

My present invention relates to couplings of a type illustrated in my patent for Coupling, No. 1,754,639, patented April 15, 1930, and also on the coupling shown in my patent application Serial No. 679,881, filed July 11, 1933, entitled Coupling and valved coupling which has matured into Patent No. 2,086,569, granted July 13, 1937.

My present invention may be considered as an improvement or further development of the coupling shown in the patent and the application.

Difficulty has been experienced in the above mentioned type of coupling in disconnecting the coupling elements, that is, in moving the so-called nipple portion of the coupling from the chuck or socket section of the coupling. In all of these types of coupling I use a coiled spring which is made in the form of a ring or annulus and this grips the nipple. Sometimes the grip of the nipple is so tight that it is difficult to disconnect the coupling by hand. Moreover, the greater the pressure of gas or fluid passing through the coupling, the more difficult it is to disconnect the elements of the coupling. However, it is not my invention to provide a means for disconnecting the coupling while under pressure, as this should be reduced to zero or a normal pressure before attempting to disengage the elements. However, irrespective of the pressures in the couplings, in some cases it has been difficult to disconnect the nipple from the chuck section.

One of the objects and features therefore of my present invention is the employment of a device used in connection with the coupling which may, on operation, positively force the disconnection of the nipple from the other parts of the coupling. This is preferably done by having a wedging action and such wedging action is preferably obtained by having a rotatable element mounted on one of the disconnectible parts of the coupling. This may be mounted either on the nipple section or on the chuck portion and which element when partly rotated, develops a wedging action between the two main elements of the coupling and positively forces their disconnection against the retaining hold of the spring or other device used to hold the nipple attached to its complementary part of the coupling.

I may obtain this wedging action by employing a collar or sleeve which rotates on the axis of the coupling and this has a pin and slot connection or a groove and thread connection with the other part of the coupling so that no matter whether the collar or sleeve is mounted on the nipple or the chuck section it may be used to disconnect these parts even when firmly secured together.

A further object and feature of my invention used particularly in large couplings is a repositioning spring used in connection with the rotating collar to return this collar to its original position after the nipple has been removed from the chuck.

My invention is illustrated in connection with the accompanying drawings, in which:

Fig. 8 is a longitudinal section of a further modification of my invention showing a construction in which the wedging collar is returned to its original position by a spring and the wedging collar is attached to the chuck element of the coupling.

Fig. 9 is a transverse section on the line 9—9 of Fig. 8 in the direction of the arrows.

Fig. 10 is a perspective view of the collar used in Figs. 8 and 9 with the abutment cap separated from the collar.

Figure 2:
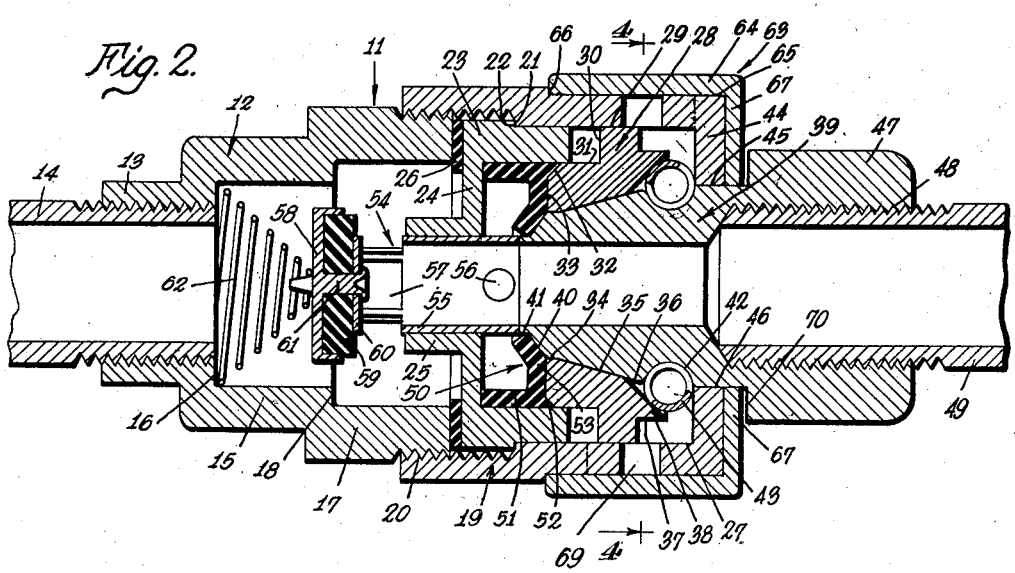
Fig. 2 is a longitudinal section on the line 2—2 of Fig. 1 in the direction of the arrows and on an enlarged scale.

Referring to the construction of Fig. 2, the chuck element 11 comprises a tubular connecter 12 which has a reduced internally threaded end 13 threaded on the exterior threads of a pipe or tube 14. This sleeve has an enlarged section 15 with a transverse internal shoulder 16. A second enlargement 17 provides an annular shoulder 18 between the internal cylindrical surface of the parts 15 and 17.

A sleeve 19 has internal threads and is threaded on the enlarged section 17 of the tubular connecter 12 as indicated at 20. The outside sleeve 19 has a small internal shoulder 21 so that it engages a complementary shoulder 22 of an internal sleeve 23. This latter sleeve has a shoulder flange 24 terminating in a cylindrical section 25 forming the bore of the inner sleeve 23. A packing gasket 26 is jammed between the inner sleeve 23 and the end of the tubular connecter 12, this being by means of the threaded outer sleeve 19. The connecter is provided with wrench gripping external faces to allow tightening of these elements, thus leakage is prevented between the tubular connecter 12, the inner sleeve 23 and the outer sleeve 19.

Slidably mounted in the inner sleeve 23 and also on the internal surface 27 of the outer sleeve 19 is the piston 28. This piston has an outer external cylindrical surface 29 bearing on the surface 27, the transverse shoulder 30 and a second outside cylindrical surface 31 which slides on the interior of the inner sleeve 23. The slight slope 32 leads to a flat top surface 33 of the piston. The piston has a short cylindrical section 34 and an outwardly tapered section 35 terminating at which is a flared wedging surface 36. A transverse shoulder 37 terminates at the cylindrical surface 29 and a cylindrical outer surface 38 joins the wedging surface 36 at the relatively sharp edge.

The nipple designated by the assembly numeral 39 has a tapered outer surface complementary to the surface 35 of the piston and a short cylindrical surface complementary to the cylindrical surface 34 of the piston and a slight sloping surface 40 terminating in a cylindrical section 41. An annular groove 42 is to accommodate the coiled ring spring 43 which engages the pressure surface of a piston and the inturned flange 44 of the outer sleeve 19. The flange 44 terminates in a cylindrical surface 45 which engages a complementary cylindrical surface 46 of the nipple and thus aids in maintaining the nipple centered. The nipple has a wrench head 47 facilitating attachment by a threaded connection 48 to a pipe 49.

A flexible packing cup 50 has a cylindrical wall section 51 bearing against the inside cylindrical section of the inner sleeve 23. This wall terminates in a fin 52 which conforms to the sloping surface 32 of the piston. The base 53 is flat with a central opening but the inner portion is pressed upwardly by the head end 40 of the nipple.

The valve designated by the assembly numeral 54 comprises a tube 55 slidable in the cylindrical section 25 of the inner sleeve 23. This tube has ports 56 at one end and openings 57. A cap 58 has a packing ring 59 therein to engage the end of the cylindrical portion 25, this ring being maintained in place by a plate 60 secured by a rivet 61 to the cap 58. A compression spring 62 bears on the shoulder 16 and forces the valve into its closed position. The valve is opened by the cylindrical end 41 of the nipple engaging the cylindrical section 55 of the valve and forcing it to the inner position shown in 52. The above description details certain features which are shown and described in my above mentioned patent and patent application and certain new features in the general coupling assembly.

In this invention the disconnecting rotatable collar and its assembly is designated by the numeral 63. This collar has a cylindrical section 64 which is preferably knurled on the outside and fits and rotates on a reduced outer surface 65 of the outer sleeve 19, this outer sleeve having a shoulder 66 against which the end of the cylindrical section 64 may contact thus being brought to a stop. An inturned flange 67 connected to the cylindrical section 64 when the coupling is assembled forms a close fit with the inturned flange 44 of the outer sleeve.

The wedging means comprises a pair or more of pins 68 which are attached to and project inwardly from the cylindrical section 64 of the collar. These operate each in a slot 69 formed in the outer sleeve 19, the slots being at a slope or angle to a circumferential line. The flange 67 is designed to engage a shoulder 70 on the wrench grip head 47 of the nipple.

Figure 1:
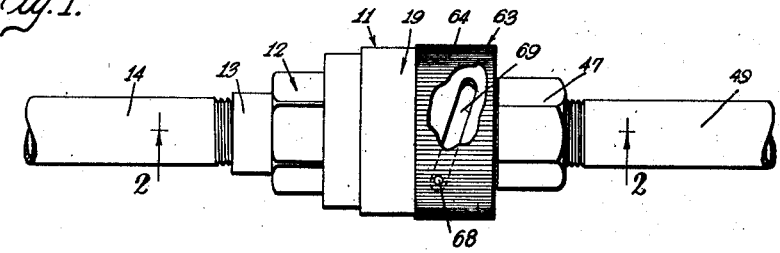
Fig. 1 is a side elevation of one form of my invention, with the wedging collar attached to the chuck element.
Figure 3:
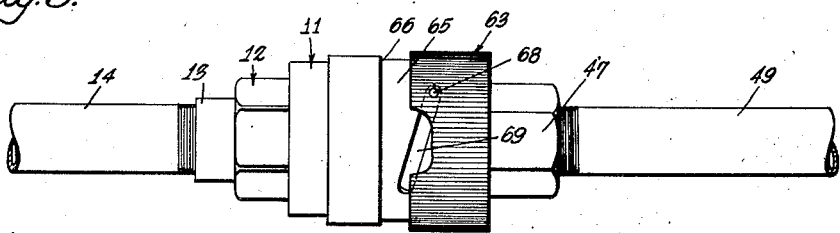
Fig. 3 is an elevation similar to Fig. 1 showing the two main parts of the coupling partly disconnected.
Figure 4:
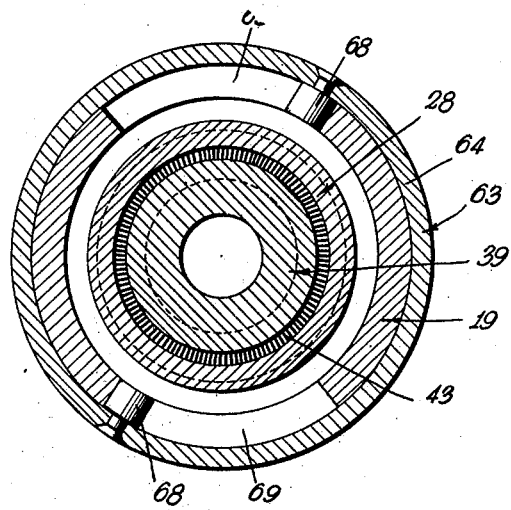
Fig. 4 is a transverse section of Fig. 2 on the line 4—4 in the direction of the arrows.

When the coupling is assembled as shown in Fig. 1 the pin 68 is at one end of the slot 69 and the flange 67 is drawn away from the shoulder 70. The coupling is held together by means of the spring ring 43 in the manner described in my patent and application above mentioned, and the greater the pressure of fluid or gas passing through the coupling the tighter the holding action. In order to release the couplings the collar is rotated, the knurled cylindrical section 64 forming a hand grip so that the pins 68 have a wedging action in the slot 69 causing the flange 67 to bear on the shoulder 70 and thus positively force the springs 43 out of the annular grooves 42 and disconnect the nipple from the piston and the chuck portion of the coupling. The partial disconnection is illustrated in Fig. 3. In this construction the slots 69 are completely enclosed when the coupling is connected and therefore no dirt can enter even should the coupling be drawn along the ground.

Figure 5:
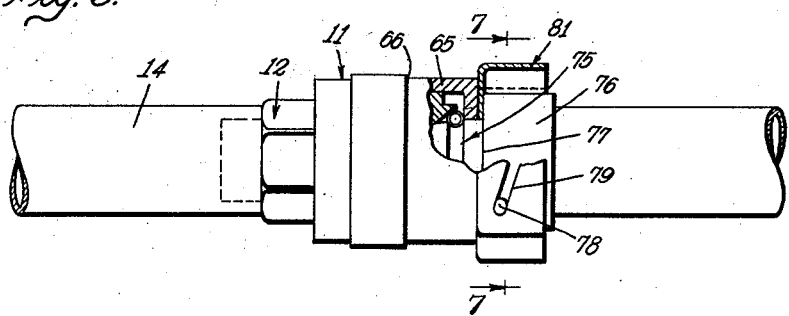
Fig. 5 is an elevation partly broken away of another form of my invention with the wedging collar attached to the nipple section of the coupling.
Figure 6:
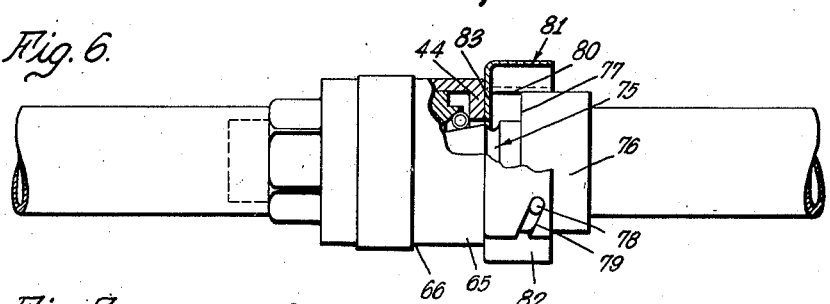
Fig. 6 is an elevation similar to Fig. 5 partly broken away showing the coupling disconnected.
Figure 7:
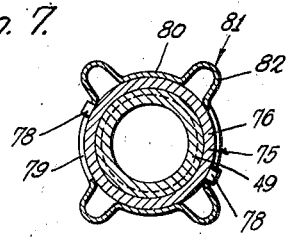
Fig. 7 is a transverse section on the line 7—7 of Fig. 5 in the direction of the arrows.

In Figs. 5, 6 and 7 the chuck element 11 is preferably of the same construction as shown in Figs. 1 through 4 and the reduced outer surface 65 is exposed as is also the shoulder 66. The nipple designated by the assembly numeral 75 has a cylindrical head 76 taking the place of the wrench head 47. A shoulder 77 terminates at this head. A plurality of pins 78 extend radially outwardly from the head and each engages in a bevelled or wedge-shaped slot 79 in the cylindrical section 80 of the rotatable collar designated by the assembly numeral 81. This collar has a plurality of outwardly bent knubs 82 to afford a convenient hand grip. An inturned flange 83 is designed to engage the inturned flange 44 of the outer sleeve 19 which sleeve in this construction does not have the grooves.

The manner of operation and functioning of the device of Figs. 5, 6 and 7 is as follows:

When the coupling is connected, that is, when the nipple is held in the chuck element, the parts are in the position shown in Fig. 5 with each pin 78 at one end of the slot in which it operates, and the shoulders 77, the flange 83 and the flanges 44 being contiguous. When it is desired to disconnect the coupling the collar 81 is rotated, the knubs 82 forming a hand grip as above described, thus affording a wedging action between the pins and slots, pressing the flange 83 of the collar against the flange 44 on the chuck structure, this positively forcing the springs out of the groove in the nipple and bringing the nipple relative to the chuck into the position shown in Fig. 6. In the structure of Figs. 5, 6, and 7 the collar is attached and remains with the nipple on account of the pin and slot connection.

The construction of Figs. 8, 9 and 10 is designed for a large coupling which may be constructed as shown in Figs. 1, 2 and 3, or if desired, the valve may be omitted and an assembly used somewhat as in my original patent or the patent application. In this case, the chuck 11 is illustrated as having an outer sleeve member 85 similar to the outer sleeve 19 of Figs. 1, 2 and 3 except that there is no reduced cylindrical section equivalent to 65 and thus no shoulder equivalent to 66. There is, however, an inturned flange 86 which is the equivalent of the inturned flange 44. This construction, however, does not have any grooves but is provided externally with projecting threads or splines 87, these being arranged on a slope in reference to the axis of the coupling. In addition, an abutment lug 88 is also formed on the exterior of the outer sleeve 85. The collar designated by the assembly numeral 89 has a cylindrical inner surface 90 which fits on the cylindrical outside sleeve 85. This has internal grooves 91 with entry ends 92; also, a sloping recess 93. The entry ends 92 permit the ends of the splines 87 to enter the grooves 91 and the recess 93 accommodates the abutment lug 88. The device may be rotated by using the handle 94 projecting from one side to bring the inturned flange 95 into contact with the inturned flange 86. This allows the nipple assembly 96 to be forced into coupling relation with the chuck structure and bringing the flange 97 on the nipple into close relation with the inturned flange 95 as shown in Fig. 8.

A cover cap 98 is secured to the thickened wall 99 of the sleeve, there being perforations 100 to accommodate screws. This cap has a sloping recess 101 terminating in an abutment shoulder 102. A coiled compression spring 103 bears at one end against the abutment face 104 of the abutment lug 88 and its opposite end engages the abutment shoulder 102 on the inside of the cap 98. This spring is curved to conform to the cylindrical curvature of the outside surface of the outer sleeve 85. A curved stop pin 105 is loosely mounted in the coiled spring 103 and is designed to limit the compression of this spring, the compression being accomplished by rotating the collar.

The manner of operation and functioning of the construction of Figs. 8 and 9 is as follows:

Presuming the coupling is assembled as shown in Fig. 8, as above mentioned, it is practically necessary to reduce or eliminate the pressure of fluid or gases passing through the coupling when it is desired to disconnect the nipple from the chuck. The handle 94, however, gives considerable leverage when rotating the collar. As the collar rotates, it rides on the splines 87 and moves outwardly longitudinally in the direction of the arrow 106 (Fig. 8). This action compresses the spring 103 and this spring may be compressed to the limit permitted by the pin 105, such action causing the inturned flange 95 of the collar to exert a thrust on the flange 97 of the nipple and force the nipple as a whole in the direction of the arrow 107 in reference to the chuck element of the coupling. This effects a disengagement of the two main parts of the coupling. The compression spring 103 then functions to return the collar and its handle to their original position which they occupied when the chuck and the nipple were in engagement.

It is noted with my coupling that when the two main elements are connected together that these are effectively held from longitudinal disconnection, but may swivel, that is rotate one relative to the other on their longitudinal axes. Moreover, the uncoupling device employing a collar or sleeve rotatably mounted on one of the elements and reacting against the other to forcibly disconnect the coupling, does not affect the rotational swivelling of the coupling elements.

In the detail construction of Fig. 2, it will be noted that the rubber cup 50 is pressed inwardly in the coupling so that its annular free edge engages the shoulder flange 24 on the inner sleeve 23. The inserting of the nipple 39 in the piston 28 forces this piston inwardly and thus brings the cup into the position illustrated. Thus the cup forms a seal against the shoulder flange 24, the sleeve portion 23, the piston and the nipple and prevents escape of fluid even under high pressure at these various points.

In my construction using the rotatable collar for disconnecting the elements of the coupling, it may be considered that the coupling is attached to one of the elements by a construction which develops a wedging action on partial rotation of the collar, together with a limit means which restricts this rotation to part of the complete turn. Further, that there are contacting surfaces between the collar and the second element of the coupling to positively move the second element outwardly longitudinally in reference to the first element during the rotation of the collar. In the construction having the pin and slot wedging arrangement the pins and the ends of the slots form a stop limit means and therefore the pins and slots have the dual function of developing the wedging action and also the stop limit means.

In the construction of Figs. 8, 9 and 10, in which there is the spline and slot connection, the slots at one end terminate at the inturned flange 95 which also forms a stop limit. In addition if the coil spring was removed, the abutment lug 88 and the end of the thickened wall 99 would also form a stop limit. However, the device is not given the full rotational movement until 88 and 89 contact on account of the interposition of the spring and the loose stop pin 105. As above mentioned the spring has the additional function of returning the collar to its initial position after disconnecting the coupling.

Various changes may be made in the details of construction without departing from the spirit or scope of the invention as defined in the appended claims.

I claim:

1. A coupling having a chuck with an inner tubular sleeve with a transverse shoulder on the inside of the sleeve and an abutment shoulder on the outside and spaced from the end of the sleeve, an outer sleeve mounted on the inner sleeve and having a complementary shoulder to engage the abutment shoulder, a connecter having a threaded engagement with the outer sleeve, a piston slidable in said two sleeves and having a central opening, a nipple fitted in said opening of the piston, means to retain the nipple and piston in a connected operative position, and a packing cup having a base engaging the piston and the nipple and a side wall engaging the inner sleeve and the annular end of the side wall engaging the inwardly extended shoulder when the piston is forced inwardly in the sleeve.

2. A coupling having a chuck element with an inner sleeve having an inwardly extending shoulder flange and an outer abutment shoulder spaced from the end thereof, an outer sleeve mounted on the inner sleeve and having a complementary abutment shoulder engaging the abutment shoulder of the inner sleeve, said outer sleeve having internal threads, a tubular connecter having external threads threaded into the outer sleeve, a packing gasket between the connecter and the inner sleeve, a tubular piston slidable in said two sleeves and having an inner pressure surface combined with a nipple fitted within the tubular portion of the piston and means to hold the nipple to prevent disconnection but allow swivelling.

3. In a coupling, a first and second tubular coupling element, means to lock said elements in operative position to form a tubular coupling, a collar rotatably mounted on one of the elements, a means forming part of the mounting to move the collar longitudinally on rotation, means to restrict the rotation of the collar to part of a single turn, and interacting means between the collar and the second element of the coupling to disengage the said coupling elements.

4. In a coupling as claimed in claim 3, a spring interengaging between the collar and the elements on which it is mounted to return the collar to its initial position after disconnection of the coupling elements.

5. A tubular coupling having a first and a second tubular coupling element, means to lock said element in operative position preventing normally its disconnection by a longitudinal movement, but allowing rotational swivelling of one element in reference to the other, a collar rotatably mounted on one of the elements, a wedging means forming part of the mounting and operative on rotation of the collar to move the collar longitudinally in reference to the element on which it is mounted, the said wedging means also forming part of a stop limit device to limit the rotation of the collar to part of a single turn, and interengaging means between the collar and the other coupling element to disengage the coupling elements on such longitudinal movement of the collar.

6. A tubular coupling as claimed in claim 5, the wedging means comprising a pin and slot connection between the collar and the coupling element, the pin and slot also being operative to limit the rotation of the collar.

7. A tubular coupling as claimed in claim 5, the wedging means comprising a spline and slot connection between the collar and the coupling element, and in addition positive stop abutments on the said coupling element and the collar.

8. In a tubular coupling having a first and a second tubular coupling element, means to lock said elements together to prevent disconnection when in normal operation, a collar rotatably mounted on the first coupling element, the rotational mounting including a wedging means to move the collar longitudinally on the first coupling element on rotation thereof, and cooperative abutments between the first coupling element and the collar to restrict the rotation of the collar to part of a single turn, and cooperative contact means between the collar and the second coupling element to positively disengage the coupling elements on the said rotational movement of the collar.

9. In a tubular coupling as claimed in claim 8, a spring between the said abutments to return the collar to its initial position after disconnection of the coupling elements.

10. In a tubular coupling as claimed in claim 8, a spring between the said abutments to return the collar to its initial position after disconnection of the coupling elements, and a pin mounted in the spring to engage the said abutments.

11. A coupling comprising in combination a chuck element having a cylindrical shaped sleeve with an inturned transverse shoulder, a tubular piston slidable in the sleeve having an inner pressure surface, a nipple insertable in the tubular piston and having an engagement therewith whereby the piston may be moved longitudinally in the sleeve by the nipple, the nipple having an inner pressure end, means to lock the nipple and piston in their inward position, a cup washer having a base with a central opening, a side wall with a free annular end, the base engaging the pressure end of the piston and the nipple, the side wall engaging the cylinder and the free end contacting the transverse shoulder when the piston is forced inwardly in the sleeve, the piston having an outwardly sloping conical surface from its pressure end, the cup having a fin extending from its base along the cylindrical sleeve to engage the cone surface of the piston.

EDWIN C. MEYER.